Figure 1:
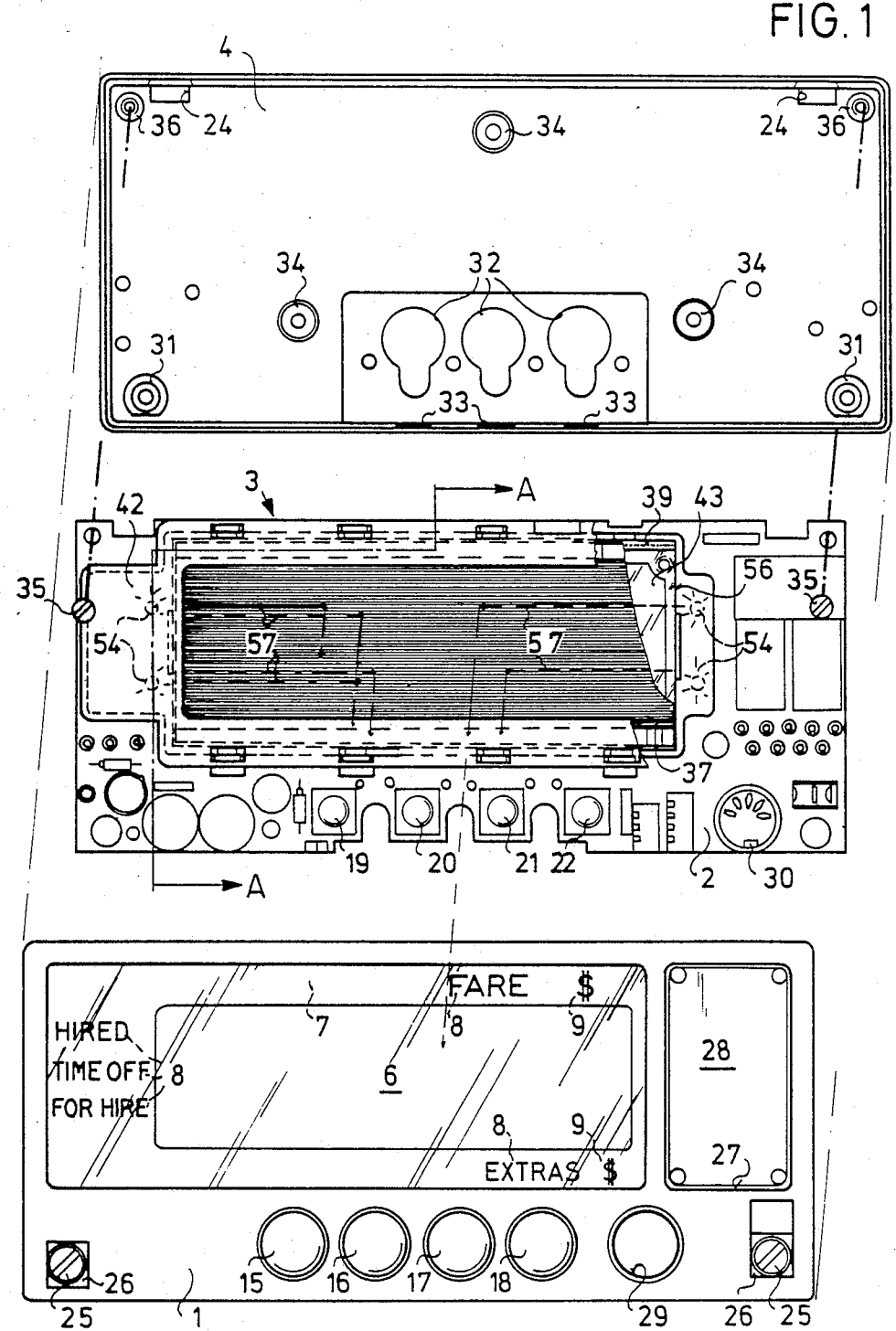

United States Patent [19]

Koch et al.

[11] Patent Number: 4,789,774
[45] Date of Patent: Dec. 6, 1988

[54] ELECTRONIC DISPLAY DEVICE

[75] Inventors: Siegfried Koch, Villingen-Schwenningen; Hans-Peter Scholl, Mundelsheim, both of Fed. Rep. of Germany

[73] Assignee: Mannesmann Kienzle GmbH, VS-Villingen, Fed. Rep. of Germany

[21] Appl. No.: 841,535

[22] PCT Filed: Jun. 20, 1985

[86] PCT No.: PCT/EP85/00300

§ 371 Date: Feb. 25, 1986

§ 102(e) Date: Feb. 25, 1986

[87] PCT Pub. No.: WO86/00449

PCT Pub. Date: Jan. 16, 1986

[30] Foreign Application Priority Data

Jun. 30, 1984 [DE] Fed. Rep. of Germany ....... 3424239

[51] Int. Cl.⁴ ............................................. G07B 13/00
[52] U.S. Cl. .................... 235/30 R; 235/29 A; 235/45; 350/338; 361/390; 361/400; 439/629
[58] Field of Search ............... 235/30 R, 45; 350/334, 350/345, 338, 331 R, 330, 339 D, 339 F, 642; 339/17 C, 17 D, 17 CF, 17 L, 17 LC, 176 MP; 361/390, 400

[56] References Cited

U.S. PATENT DOCUMENTS

| | | | |
|---|---|---|---|
| 3,991,463 | 11/1976 | Squitieri et al. | 350/334 X |
| 4,012,117 | 5/1977 | Lazzery | 350/331 R |
| 4,059,916 | 11/1977 | Tachihara et al. | 40/448 |
| 4,126,383 | 11/1978 | Doriguzzi et al. | 350/338 |
| 4,209,688 | 6/1980 | Kelch | 235/30 R |
| 4,247,928 | 1/1981 | Dorfman | 368/67 |
| 4,357,061 | 11/1982 | Crosby | 339/17 C |
| 4,422,728 | 12/1983 | Andreaggi | 350/334 |
| 4,574,189 | 3/1986 | Adams et al. | 235/30 R |
| 4,616,295 | 10/1986 | Jewell et al. | 350/345 X |

FOREIGN PATENT DOCUMENTS

| | | |
|---|---|---|
| 2739783 | 3/1978 | Fed. Rep. of Germany . |
| 2952370 | 7/1981 | Fed. Rep. of Germany . |
| 2801634 | 7/1981 | Fed. Rep. of Germany . |
| 3139203 | 4/1983 | Fed. Rep. of Germany . |
| 3247531 | 12/1983 | Fed. Rep. of Germany . |
| 2326002 | 4/1977 | France . |
| 2043358 | 10/1980 | United Kingdom . |
| 2116805 | 9/1983 | United Kingdom . |

Primary Examiner—Benjamin R. Fuller
Attorney, Agent, or Firm—Toren, McGeady & Associates

[57] ABSTRACT

The invention is directed to an electronic multidigit display device illuminatable by means of light sources intended for a taximeter for indication of a trip price, of a possibly occurring surcharge as well as for superposition of stored data. The display device (3) is composed of a transflecting liquid crystal display (37) (LCD), a frame (38) as a common receptacle of the liquid crystal display (37) and a light-conducting plate (43) and contact elements (39) for electrically connecting the liquid crystal display (37) with actuation lines (40) on a printed circuit board (2) and a hood (42) surrounding the frame (38) and provided with detent elements (41). By means of the hood (42) the complete display device (3) can be plugged into the printed circuit board and detented with same in a correct position with simultaneous completion of all line connections. The display device (3) is designed as a component intended specifically for the printed circuit board and for application in a taximeter device.

9 Claims, 3 Drawing Sheets

ELECTRONIC DISPLAY DEVICE

The invention is directed to a multi digit electronic display device illuminatable by means of light sources, for instance for a taximeter for display of a fare to be paid and possibly accumulating surcharges, as well as for overlay of storage- or tariff data.

Electronic display devices for presentation of numerals and characters have been known for years and are of differing structure and operation not lastly because of the utilization manner. A widely used embodiment form is constituted by the liquid crystal display (LCD), which in one typical application case is utilized as a 7-segment display in apparatus with digital display. The basic principle of a liquid crystal cell consists as is well known in that two glass plates are covered at the faces facing each other with transparent conductive coatings, which are masked according to the desired display configuration. In a cell between the glass plate there is located a nematic, crystalline liquid, which under the influence of the electrical field forms zones with different refraction index when a voltage is applied to the thin film electrodes. Depending on the design of the structure of the one transparent electrode the liquid crystal cell can be utilized for the presentation of numerals, letters or other communication characters. Depending on the type of operation one differentiates between reflection operation, transmitted light or transmitted operation and a transflective operation. In the reflection operation the illumination of the reflective display occurs by the existing ambient light, by arranging a mirror on the rear side of the cell. In transmitted light operation of a liquid crystal cell the light source is located on the rear side behind the display element. By arranging a diffuser between the light source and the liquid crystal cell one achieves that the light is absorbed as ideally as possible.

In transflective operation a semi-transparent mirror is located on the rear side of the liquid crystal cell, which on the one hand reflects the ambient light, on the other hand however is sufficiently transparent for light, so that the liquid crystal cell is illuminated by the switched-on light source with diffuser. A change between the thereby effective operational modes with transmitted light and reflection occurs automatically depending on the illumination intensity of the ambient field. This means in case of an ambient field illumination intensity which is higher than the built-in background illumination, a reflection operation is set up, in the reverse case the liquid crystal cell works by transmitted light operation. Such a liquid crystal display is suitable for such application cases, where a background illumination is continuously switched on but also for display types, where the background illumination can be switched by the observer in case of necessity. The transfluxor operation of a liquid crystal display with permanently switched-on background illumination in the operating state affords the considerable advantage through the property of an automatic change onto the optimum type of operation depending on the momentary illumination intensity, that the symbols displayed appear always with the best possible contrast effect against the background. Thereby the readability of a display field remains constant even with constantly changing ambient light conditions. To that extent this property speaks in favor of an application in the motor vehicle as a taximeter display, if one achieves satisfaction of the requirements in the taxi vehicle by a sensible arrangement and design of the display field.

It is the task of the invention to design and arrange a multi-digit electronic device for a taximeter in such a way that it can be completed out of simple parts and can be plugged into a printed circuit board by means of suitable connection means, whereby at the same time the actuation lines are connectible with the printed circuit board and a space saving arrangement for optimum illumination of the displayable information is assured.

A solution of this task is seen therein, that the display device is composed of a transflective type liquid crystal display (LCD) of a frame as a common receptacle of the liquid crystal display and a printed circuit board and contact elements for connecting the liquid crystal display with actuation lines on the printed circuit board and a hood with snap-in elements embracing the frame, with which the display device can be plugged in so as to be correctly positioned on the printed circuit board and is detentable with said same with simultaneous completion of all line connections.

An essential advantage of the invention lies therein, that a transflective liquid crystal display is utilized, which with a suitable utilization of ambient light conditions assures an extensively constant contrast formation between background and the characters to be depicted in reflection operation and with an additional supply by a built in light source for the transmitted light operation. In the sense of a space-saving embodiment shape a frame is proposed, which serves at the same time as a receptacle of the liquid crystal display above a printed circuit board as well as several contact elements, which as interconnectors connect the actuation lines on the printed circuit board with the liquid crystal display in the assembled condition. The frame exhibits an intermediate bottom, which on the one hand serves as a receptacle for a light conducting plate, on the other hand it creates a cavity towards the printed circuit board and thereby the possibility of equipping the printed circuit board with components on both sides. In order to favorize a flat type of construction, light sources responsible for the background illumination for the transmitted light are arranged on both sides of the printed circuit board at the level of the front faces of the display device and compartmented by light source chambers in such a way that a light beam passage through the light conducting plate and transparent cover plate is purposely dispersed onto the surfaces to be illuminated. With simple measures the light conducting plate exhibits two light zones, on the one hand for a uniform area distribution of transmitted light to the liquid crystal display, on the other hand it serves simultaneously by means of a light conducting zone in the edge area of the light conducting plate for illumination of transparent type characters arranged correspondingly in front of it in the type field. In order to achieve a uniform illumination of the whole area of the liquid crystal display, the light-conducting plate consists of prismatic light conducting members extending inward from both sides of the light source, whose surfaces are dull. By appropriate shaping of the surface for instance with a sawtooth profile, prismatic surface and such like patterned effects in the illuminated area are achievable of the type of strip patterns, light points with optically slight bright-dark zones, or portions on the display can be illuminated in such a way that they are imparted a certain delimitation by a differentiable bright-dark illumination, for instance for the purpose of emphasizing differing significance of the display areas. Finally the complete display device is designed as a component specific for the printed circuit board, by equipping the frame in its capacity as a receptacle of the liquid crystal display of the light conducting plate not to mention the rubber guide connector as interconnector to the printed circuit board with centering lugs, which plunge into bores appropriately provided in printed circuit board and thus assure an absolutely unmistakeable connection between the conductor path on the printed circuit board and the character actuation lines at the liquid crystal display. Without the necessity of cumbersome soldering connections or installation processes the frame together with the circuit components and with a hood embracing all parts and equipped with snap-in elements is plugged into the printed circuit board. The design of the entire assembly of the electronic display device is thus realized so as to be extremely easy to service, by rendering a replacement of parts of same accomplishable merely by snap-out of the snap-in elements and also by enabling access to the components arranged on the printed circuit board without work requiring tools.

An embodiment example of the invention is described in the following and illustrated with the help of the drawing.

Figure 2:
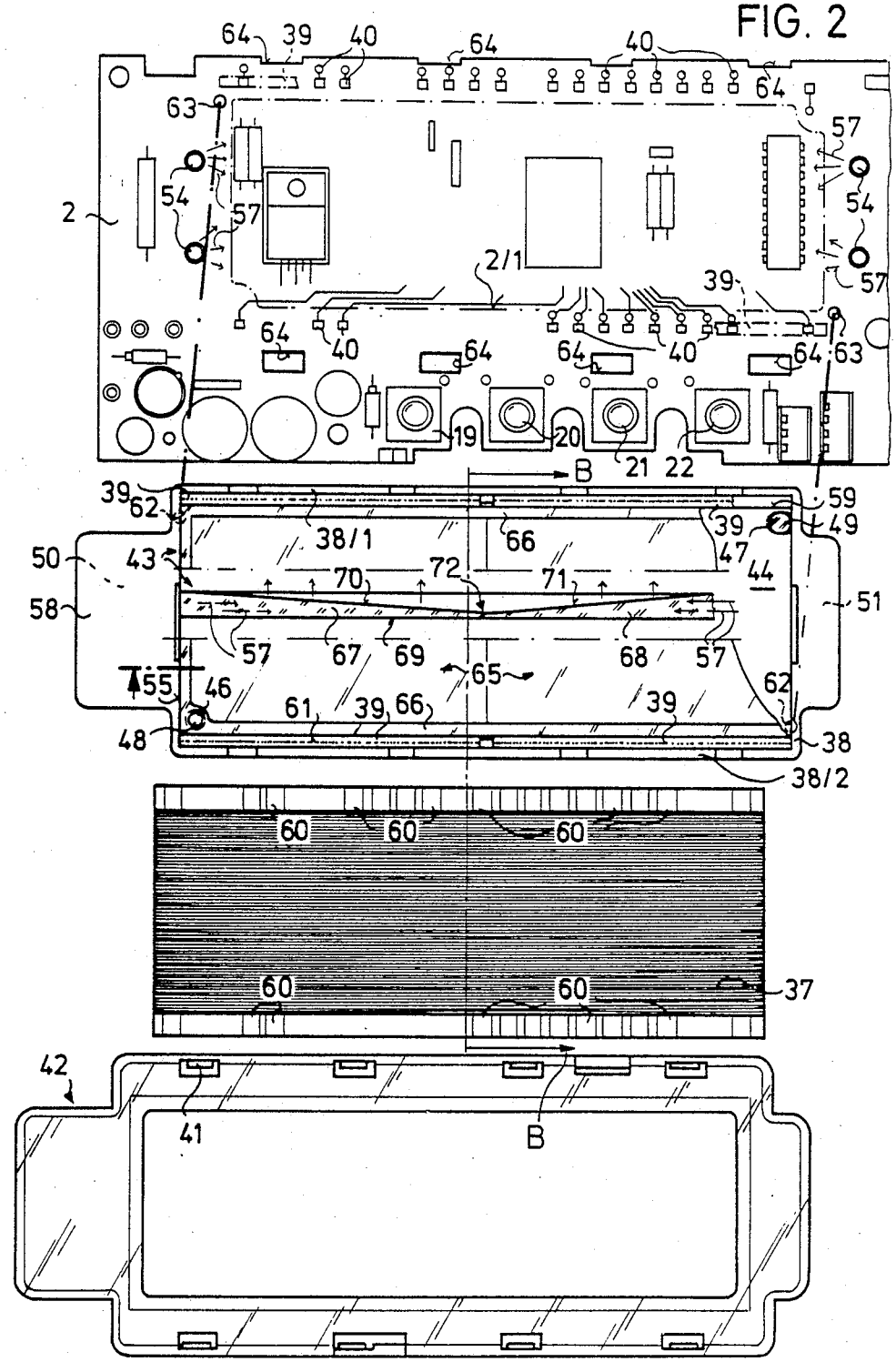
Figure 3:
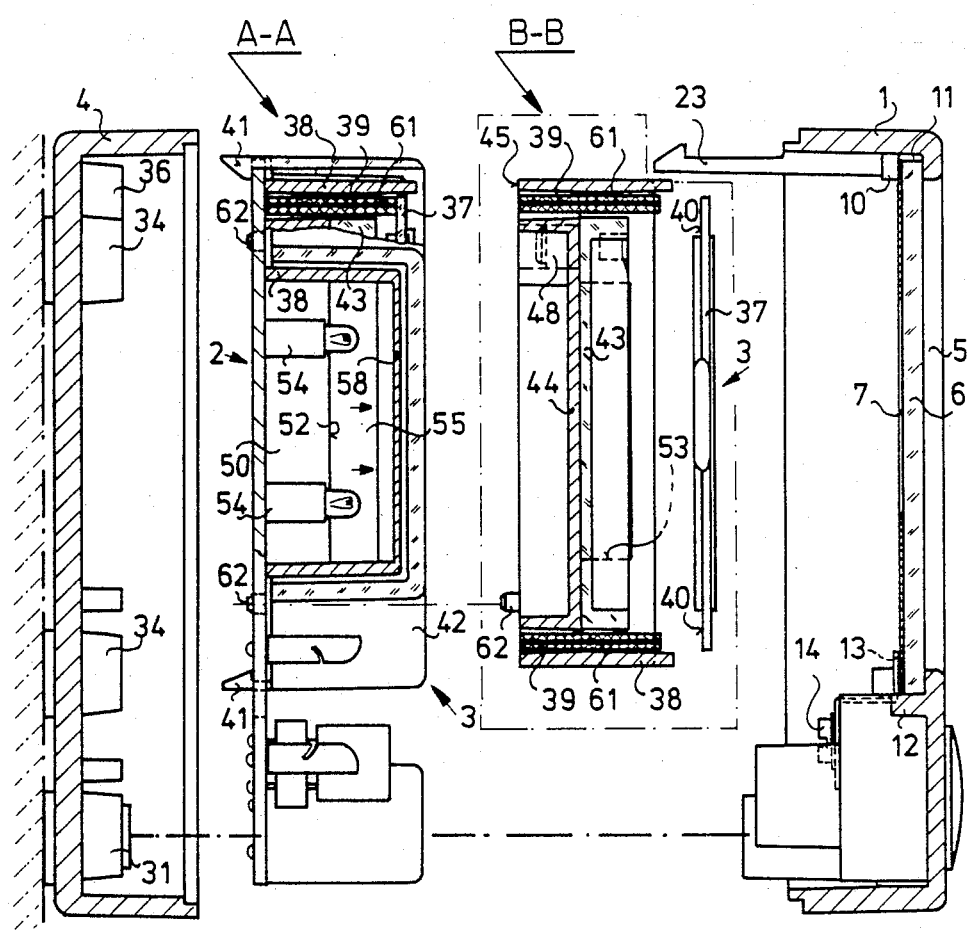

It is shown on:

FIG. 1 a complete taximeter in exploded presentation, consisting of a housing shell arranged at the front face, a complete electrical circuit arrangement including the display device and a rear housing shell, FIG. 2 a printed circuit board as a system support for the circuit and the display device, whereby the last-mentioned item is shown in exploded presentation, FIG. 3 an exploded presentation of the complete taximeter in side view, partially in section.

FIG. 1 shows a complete taximeter in exploded presentation. Thus the taximeter consists essentially of three assembled components, namely the housing shell 1 on the front face, a completely assembled printed circuit board 2 including a display device 3 and finally the rear housing shell 4, which comprises means for a cable lead through and an attachment of the taximeter in the motor vehicle. An opening 5 is provided in the front face housing shell 1, into which a transparent plate 6 is fitted, behind which plate there is additionally provided a title field with translucent title characters 8 and symbols 9 for designation of the information insertable by the display device 3. The plate 6 and the title piece 7 are inserted together into a groove 11 formed by projecting dogs 10 at the housing inner wall and are retained in the correct functional position by means of a protruding edge 12 at the housing shell 1. The plate 6 and the title field 7 are secured by a simple sheet metal angle 13, which is attached at the housing shell 1 by means of a screw 14 (FIG. 3). Four pushbuttons 15, 16, 17, 18 are built into the front face housing shell 1, which with closed housing correspondingly acts upon four switches 19, 20, 21, 22 on the printed circuit board 2. The housing shell 1 has detent tabs 23 at its upper wall, which snap into cutouts 24 of the housing shell 4 at assembly. The housing shells 1 and 4 are protected against unauthorized opening with screws 25 which are enclosed into sealed shells 26 and screwed into threaded sockets 31 in the rear housing shell 4. A name plate 28 with data pertaining to the design is iveted into an opening 27 on the front face of the housing shell 1. Finally a bore 29 is provided through which a plug-in connection can be made from the outside into a multipin socket 30 on the printed circuit board 2. In the rear housing shell 4 cable passages 32, 33 are indicated towards the rear as well as towards below, which are designed as intended failure zones and can be broken out in case of necessity. The device is attached in the motor vehicle by means of screws through reinforced socket 34 on the rear wall of the rear housing shell 4. The assembled printed circuit board 2, as indicated in FIG. 1, is inserted into the rear housing shell 4 and attached upon threaded shells 26 with two screws 35. FIGS. 1 and 3 show a display device 3 in the installed state, and, as can be discerned there and is separately presented in FIG. 2 the display device is composed of a transflecting liquid crystal display (LCD) 37. The transflecting properties of the display 37 are obtained by a semi-transparent mirror at the rear side of teh display 37. The display 37 further includes of a frame 38 as a common receptacle of the liquid crystal display 37, a light conducting plate 43, contact elements 39 for connecting the liquid crystal display 37 with the actuation lines 40 upon the printed circuit board 2. The display device 3 can be plugged in and detented on the printed circuit board 2 in a correct position with simultaneously completing all electrical line connections by means of a hood 42 embracing the frame 38 and equipped with detent elements 41. The frame 38 exhibits an intermediate bottom 44, which is spaced from the contact face 45 of the frame 38 upon the printed circuit board 2, so that the surface 2/1 of the printed circuit board 2 can be utilized also in this area for installation of components on both sides. Centering bores 46, 47 are provided in the intermediate bottom 44, which serve for receiving the light conducting plate 43 in the correct position, at which for this purpose guidance lugs 48, 49 are molded on. On both sides of the frame 38 box-type members forming light source chambers 50, 51 are molded on. Above the intermediate bottom 44, the box-type members having openings adjacent the light conducting plate 43 so that respectively one light guiding channel 52, 53 is formed by each opening, through which the light beams 57 produced by respectively two lamps 54 arranged on the printed circuit board 2 can be introduced through side faces 55, 56 into the installed light guiding plate 43.

The light source chamber 50 exhibits a transparent cover plate 58. The diffused light shining through the cover plate 58 serves for the illumination of transparent title characters 8 arranged on the title field 7 arranged above said cover plate.

Between the intermediate bottom 44 and the peripheral frames 38/1 and 38/2 openings 59 are provided at the upper and lower longitudinal edges of the frame 38, into which contact elements 39 are insertable extending from the rear side to the front side of the frame 38. As contact elements 39 rubber guided connectors or construction elements designated commercially as interconnectors are provided. As can be particularly discerned from FIGS. 2 and 3 a direct, conducting connection of all LCD-actuation electrodes 60 with actuation lines 40 appropriately arranged upon the printed circuit board 2 is achievable by installing the liquid crystal display 37 in the frame 38 and upon the slightly protruding rubber guidance connector 39 consisting of an elastically deformable material. For this purpose the LCD-actuation electrodes 60 on the inside of the front glass plate of the liquid crystal display 37 are conducted outside the liquid crystal cell and rest with some contact pressure upon the electrically anisotropic layer 61 of the rubber guide connector 39. The connecting line for signals to the correspondingly assigned actuation line 40 upon the printed circuit board 2 is produced by the layer 61 conductive in one direction. In order to achieve a correct assignment of the LCD-actuation electrodes 60 to the actuation lines 40 upon the printed circuit board 2 through the rubber guide connector 39, centering lugs 62 are provided at the rear side of the frame 38, which engage into bores 63 upon the printed circuit board 2 and assure a positionally correct placement of the entire display device upon the printed circuit board 2. The frame 38 with a hood 48 embracing the frame 38 and the liquid crystal display 37 installed therein is fastened, in that detent elements 41 shaped at flexible arms at the longitudinal sides are introduced and snapped into recesses 31 correspondingly provided in the printed circuit board 2. Hereby the rubber guide connector 39 protruding with oversize beyond the frame 38 is somewhat compressed for improving of the conducting connection at the contact points of the rubber guide connector 39 to the LCD-actuation electrodes 60 on the one side and the actuation lines 40 upon the printed circuit board 2 on the other side.

The light conducting plate 43 exhibits two light conducting zones 65, 66. One light conducting zone 65 is designed for a uniform area distribution of transmitted light upon the liquid crystal display 37 because of the coupling in on the side of light beams 57 by the lamps 54, and a second light conducting zone 66 is arranged in the edge area of the light conducting plate 43 for illumination of correspondingly placed in front of it transparent title characters 8 and symbols in an opaque title field 7. For a uniform illumination of the area of the liquid crystal display 37 with transmitted light the light conducting plate 43 exhibits transparent light conducting members 67, 68 extending prismatically inwards from the arrangement of the lamps 54 as light sources. The front face area 55, 56 which serves for the coupling-in of the light means 57, as well as the rear side 69 of the light conducting plate 43 are transparent and polished for assisting the reflection of the light beams 57 in the transmitted light direction onto the liquid crystal display 37. The surfaces 70, 71 of the light conducting members 67, 68 are dulled in the transmitted light area and merge into each other in the transition zone by means of a fillet or radius 72. The dullness upon the surfaces 70, 71 serves for diffusion and thus for a uniform dispersion of the light beams 57. The fillet 72 in the transition zone extensively avoids a differing brightness zone in this area. Instead of the surface dullness of the light conducting members 67, 68 structural variants are also conceivable. Thus for instance intended patterns in the illumination of the display device 3, such as strip patterns or point patterns with bright-dark effect can be achieved by means of sawtooth profiles or by cat-eye profiles. In order to assist the light reflection effect the frame 38 surrounding the light conducting plate 43 is fabricated from a light colored preferably white material. The hood 42 is fabricated from a transparent material, so that the light effect shining through from the light source chamber 50 and the light conducting zone 66 of the light conducting plate 43 can serve for illumination of the title field information. Because of the design of the parts which can be plugged together as well as an optimum arrangement in a frame 38 the positionally correct assignment of all parts with respect to each other is assured. An exact placement upon the printed circuit board 2, particularly as far as the contact between the actuation electrode 60 of the liquid crystal display 37 and the actuation lines 40 upon the printed circuit board is concerned is automatically assured by means of centering lugs 62 and correspondingly provided bores 63 in the printed circuit board 2. Finally it has been achieved by means of the hood 42 surrounding all parts of the display device 3 and attachable by means of detent elements 41 to create a design of a complete display device 3 specially adapted to the printed circuit board, which is usable as a plug-in component with simultaneous completion of all line connections.

We claim:

1. Multi digit electronic display device illuminatable by means of light sources, for instance for a taximeter for display of a fare to be paid and possibly occurring surcharge, as well as for superimposition of stored and tariff data, comprising a display device (3) having front and rear sides and composed of a liquid crystal display (37) (LCD), the liquid crystal display including a semi-transparent mirror located on a rear side of a liquid crystal cell, the semi-transparent mirror having reflective properties for reflecting ambient light and being transparent for light, a printed circuit board (2) including actuation lines, a frame (38) as a receptacle of the liquid crystal display (37), a light conducting plate (43) mounted on the frame (38) and contact elements (39) attacned to the frame (38) for electrical connection of the liquid crystal display (37) with actuation lines (40) on the printed circuit board (2) and a hood (42) surrounding the frame (38); the hood (42) equipped with detent elements (41) for locking the display device (3) to the printed circuit board (2), whereby the display device (3) is mounted is correct position on the printed circuit board with simultaneous completion of all line connections.

2. Display device according to claim 1, wherein the frame (38) has sides and an intermediate bottom (44) provided with centering bores (46, 47) and box-type members defining light source chambers (50, 51) molded on on both sides, the bores serving for receiving the light conducting plate (43) in correct position,
the intermediate bottom being open toward the sides for the completion of a light guidance channel (52, 53) to the light source chambers (50, 51).

3. Display device according to claim 2, wherein the light source chamber (50) has a transparent cover plate (58) for illumination of light transparent title characters (8) arranged in a title field (7) above said cover plate.

4. Display device according to claim 2, wherein openings (59) are provided between the intermediate bottom (44) and the frame (38) into which are insertable the contact elements (39) so that they extend through the rear side into the front side of the frame (38).

5. Display device according to claim 4, characterized in that the contact elements (39) are rubber guide connectors (interconnectors).

6. Display device according to claim 5, wherein centering lugs (62) are provided in the rear side of the frame (38), bores (63) being provided on the printed circuit board, the lugs (62) engaging into the bores (63) on the printed circuit board (2) for placing of the rubber guide connectors (39) in correct position with respect to actuation lines (40) arranged upon the printed circuit board (2).

7. Display device according to claim 6 wherein by installation of the liquid crystal display (37) in the frame (38) and on the rubber guide connector (39), a direct, a conducting connection of all LCD-actuation electrodes

(60) with actuation lines (40) correspondingly arranged upon the printed circuit board (2) is effected.

8. Display device according to claim 3, wherein the light conducting plate (43) has an edge area and two light conducting zones (65,66), one light conducting zone (65) serving for a uniform area distribution of transmitted light upon the liquid crystal display (47), and a second light guidance zone (66) in the edge area of the light guidance plate (43) serving for illumination of title characters (8) and symbols (9) upon the title field (7) appropriately arranged in front of it.

9. Display device according to claim 8, wherein the light guidance plate (43) include transparent light guidance members (67, 68) having surfaces (70, 71) prismatically extending inwards from the light source for the purpose of a uniform illumination of the surface of the liquid crystal display (37), the surfaces (70, 71) of said light guidance members being dull in the transmitted light area and being filleted in the transition zone.

* * * * *